(12) United States Patent
White et al.

(10) Patent No.: US 10,603,621 B2
(45) Date of Patent: *Mar. 31, 2020

(54) HIGH PURITY ADSORPTION AIR SEPARATION UNIT

(71) Applicant: Pacific Consolidated Industries, LLC, Riverside, CA (US)

(72) Inventors: Dave White, Riverside, CA (US); Dave Scheierl, Riverside, CA (US); Tarik Naheiri, Dana Point, CA (US); Gary Swiniarski, Lauderdale Lakes, FL (US)

(73) Assignee: Pacific Consolidated Industries, LLC, Riverside, CA (US)

( * ) Notice: Subject to any disclaimer, the term of this patent is extended or adjusted under 35 U.S.C. 154(b) by 83 days.

This patent is subject to a terminal disclaimer.

(21) Appl. No.: 15/811,256

(22) Filed: Nov. 13, 2017

(65) Prior Publication Data
US 2018/0065075 A1 Mar. 8, 2018

Related U.S. Application Data

(63) Continuation of application No. 14/974,373, filed on Dec. 18, 2015, now Pat. No. 9,821,265.
(Continued)

(51) Int. Cl.
*B01D 53/04* (2006.01)
*B01D 53/00* (2006.01)
(Continued)

(52) U.S. Cl.
CPC ............ *B01D 53/002* (2013.01); *B01D 53/02* (2013.01); *B01D 53/0476* (2013.01);
(Continued)

(58) Field of Classification Search
CPC .. B01D 53/002; B01D 53/02; B01D 53/0476; B01D 53/053; B01D 53/22;
(Continued)

(56) References Cited

U.S. PATENT DOCUMENTS 4,869,733 A * 9/1989 Stanford ................ B01D 53/04 95/19
4,880,443 A * 11/1989 Miller .................... B01D 53/04 95/98
(Continued)

*Primary Examiner* — Frank M Lawrence, Jr.
(74) *Attorney, Agent, or Firm* — Heisler & Associates

(57) ABSTRACT

An air separation unit includes an air inlet with a reversible blower downstream therefrom and an adsorption bed filled with adsorption media downstream of the reversible blower. The adsorption bed contains an adsorption media which preferentially adsorbs nitrogen over oxygen. An oxygen and argon output is located downstream of the absorption bed. At least a portion of the mixed gas of oxygen and argon is routed to a modular argon separator which separates out at least a portion of the argon to provide high purity oxygen to a high purity oxygen outlet. The argon separator can be configured as a molecular sieve filter to separate the argon from the oxygen or the argon separator can be in the form of a gas cooler and condenser which condenses liquid oxygen for storage and discharge as substantially pure oxygen.

8 Claims, 7 Drawing Sheets

Related U.S. Application Data

(60) Provisional application No. 62/098,052, filed on Dec. 30, 2014.

(51) Int. Cl.
*B01D 53/047* (2006.01)
*B01D 53/02* (2006.01)
*B01D 53/22* (2006.01)
*B01D 63/02* (2006.01)
*B01D 53/053* (2006.01)

(52) U.S. Cl.
CPC ........... *B01D 53/22* (2013.01); *B01D 53/229* (2013.01); *B01D 63/02* (2013.01); *B01D 53/053* (2013.01); *B01D 2256/12* (2013.01); *B01D 2257/102* (2013.01); *B01D 2257/11* (2013.01); *B01D 2257/40* (2013.01); *B01D 2257/80* (2013.01); *B01D 2259/401* (2013.01); *B01D 2259/402* (2013.01); *B01D 2259/40007* (2013.01); *B01D 2259/40009* (2013.01)

(58) Field of Classification Search
CPC .. B01D 53/229; B01D 63/02; B01D 2256/12; B01D 2257/102; B01D 2257/11; B01D 2257/40; B01D 2257/80; B01D 2259/40007; B01D 2259/40009; B01D 2259/401; B01D 2259/402
USPC ........... 95/43, 45, 54, 95–98, 100–102, 130; 96/4–14, 134; 62/617, 640
See application file for complete search history.

(56) References Cited

U.S. PATENT DOCUMENTS

| | | | | |
|---|---|---|---|---|
| 5,102,432 A | * | 4/1992 | Prasad | B01D 53/226 95/54 |
| 5,125,934 A | * | 6/1992 | Krishnamurthy | B01D 53/0476 95/101 |
| 5,137,549 A | * | 8/1992 | Stanford | B01D 53/047 95/117 |
| 5,470,378 A | * | 11/1995 | Kandybin | B01D 53/047 95/100 |
| 5,827,351 A | * | 10/1998 | Prasad | B01D 53/047 95/45 |
| 6,475,265 B1 | * | 11/2002 | Baksh | B01D 53/047 95/101 |
| 6,698,423 B1 | * | 3/2004 | Honkonen | B01D 5/0039 128/201.21 |
| 7,875,101 B2 | * | 1/2011 | Staiger | B01D 53/047 95/138 |
| 8,496,738 B1 | * | 7/2013 | Naheiri | B01D 53/0476 137/511 |
| 9,821,265 B2 | * | 11/2017 | White | B01D 53/0476 |
| 2004/0045315 A1 | * | 3/2004 | Kamoshita | F25B 9/145 62/615 |
| 2008/0092740 A1 | * | 4/2008 | Vandroux | B01D 53/047 96/4 |
| 2010/0095841 A1 | * | 4/2010 | Naheiri | B01D 53/0476 95/26 |

* cited by examiner

HIGH PURITY ADSORPTION AIR SEPARATION UNIT

CROSS-REFERENCE TO RELATED APPLICATIONS

This application is a continuation of U.S. patent application Ser. No. 14/974,373 filed on Dec. 18, 2015, which claims benefit under Title 35, United States Code § 119(e) of U.S. Provisional Application No. 62/098,052 filed on Dec. 30, 2014.

FIELD OF THE INVENTION

The following invention relates to adsorption based air separation units (ASUs) with adsorption beds containing media which preferentially adsorbs nitrogen over oxygen to separate oxygen and argon therefrom. More particularly, this invention relates to adsorption based ASUs which further include argon separators to provide high purity oxygen from the system.

BACKGROUND OF THE INVENTION

The production of oxygen using vacuum swing adsorption (VSA) is well-known to air separation technologists. VSA offers a simple non-cryogenic method to produce gaseous oxygen at purities of 80% to 95%. In the last 20 years oxygen VSA plants have become widespread and are offered in various bed configurations. The multi-bed VSA is typically used in the size rage of 60 tons per day (TPD) and higher. The single bed process was adopted as a lower capital, simpler process for lower production ranges, typically 1 TPD up to 40 TPD. Typical single bed systems usually consist of a single blower train that is used for both the feed air provider as well as the regeneration vacuum system. The process usually incorporates automatic valves to direct the air and vacuum flows during the cycle. A newer embodiment of the single bed process uses a reversing blower to generate the feed stream and apply vacuum for the regeneration step. This latest embodiment is well suited for small to medium sized oxygen VSA production plants (1 to 10 TPD). One example of a single bed reversing blower (SBRB) VSA process of this type is described in U.S. Pat. No. 8,496,738.

Although the single bed reversing blower (SBRB) VSA process is simple in practice, its simplicity comes with performance trade-offs when compared to multi-bed systems. Firstly, the lack of additional adsorber beds does not allow for a crucial bed to bed equalization. The pressure equalization step is key to lowering power consumption and increasing product oxygen recovery. Technologists in the art have overcome this deficiency by adding an equalization tank to the SBRB system (such as equalization tanks in SBRB systems provided by Air Liquide of Houston, Tex.).

Typical VSA (and PSA) adsorption systems using molecular sieve for oxygen production are limited to oxygen purity below about ninety-six percent. This is because air is one percent argon and typical adsorption materials neither adsorb oxygen nor argon. Thus, argon is collected with the oxygen and ends up limiting the purity of the oxygen. For many purposes, having generally inert argon within the oxygen is not a particular problem. However, in some instances it is desirable to have oxygen which has a higher purity than ninety-six percent.

SUMMARY OF THE INVENTION

With this invention in one embodiment, hollow fiber membranes are utilized to further purify oxygen discharged from the bed. Such hollow fiber membranes are known to be used to separate air for the production of nitrogen. Produced oxygen (and argon) downstream from a single bed reversing blower VSA system is routed through a hollow fiber membrane to recover a permeate that is richer in oxygen.

This additional process can be provided as a modular add on to an existing SBRB unit or other adsorption based ASU. The additional high purity module would consist of a hollow fiber membrane, control valve and an additional compressor if needed. As an additional step, a small scale cryogenic distiller could be utilized to polish the oxygen product to a greater percentage of purity, and supply the oxygen in a liquid form for longer term storage of larger amounts of oxygen in a smaller space. The liquefied VSA product is run through a small distillation column to strip out the argon, thus producing a final liquid oxygen and/or gaseous oxygen product that exceeds ninety-nine percent oxygen purity.

OBJECTS OF THE INVENTION

Accordingly, a primary object of the present invention is to provide an adsorption based air separation unit which can output high purity oxygen by separation of argon from oxygen produced downstream of an adsorption bed which preferentially adsorbs nitrogen over oxygen.

Another object of the present invention is to provide a method for separation of oxygen from air which achieves higher than ninety-six percent purity oxygen.

Another object of the present invention is to provide high purity oxygen from air separation, while minimizing or eliminating the need for liquefaction.

Another object of the present invention is to provide an oxygen separator which separates oxygen to a high purity efficiently.

Another object of the present invention is to provide a system for separation of high purity oxygen from air, utilizing robust simple equipment.

Other further objects of the present invention will become apparent from a careful reading of the included drawing figures, the claims and detailed description of the invention.

DESCRIPTION OF THE PREFERRED EMBODIMENT

Figure 1:
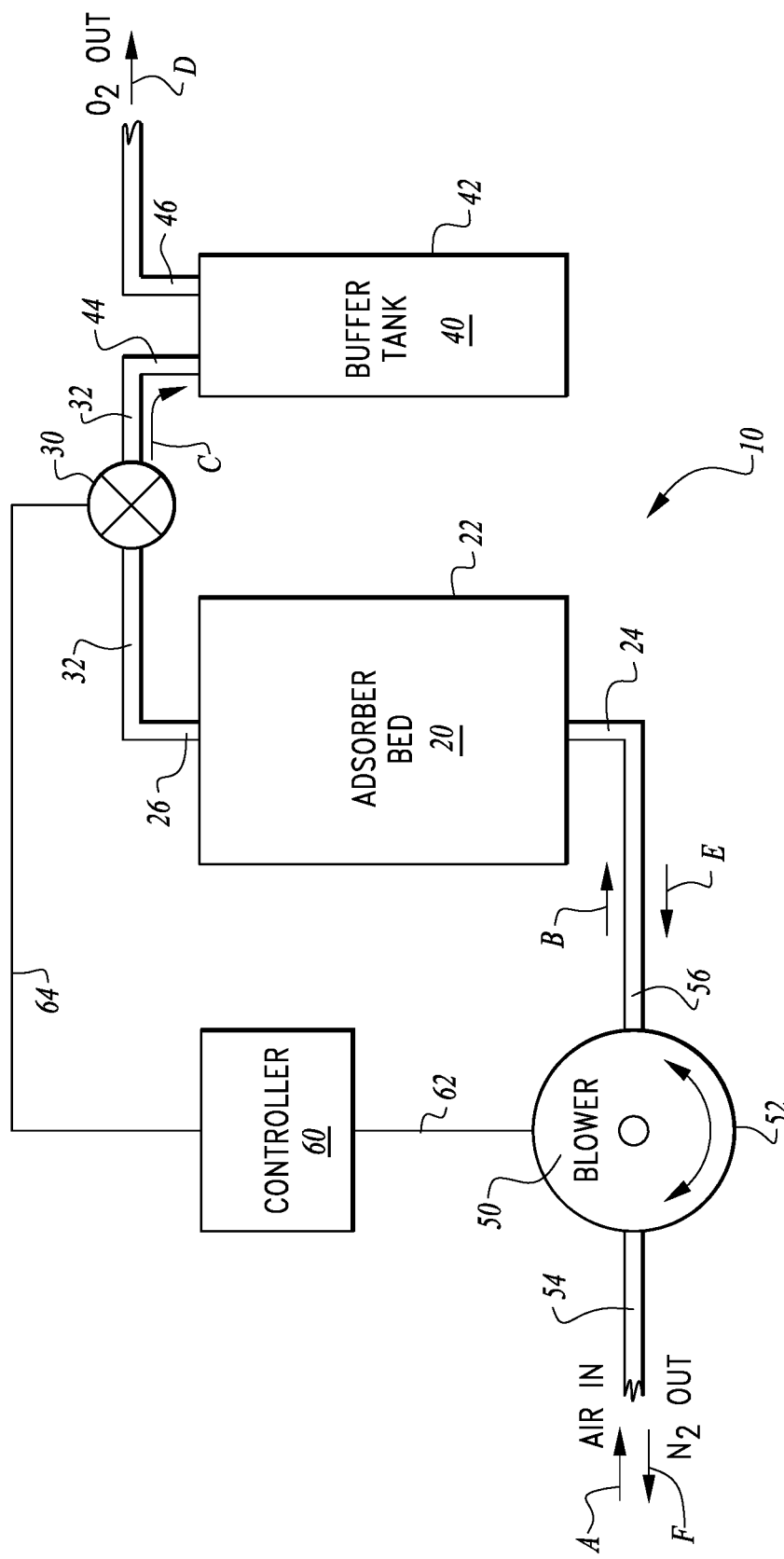
FIG. 1 is a schematic of a prior art single bed reversing blower (SBRB) vacuum swing adsorption (VSA) air separation unit (ASU) to which the technology of this invention is addressed.

Referring to the drawings, wherein like reference numerals represent like parts throughout the various drawing figures, reference numeral 10 (FIG. 1) is directed to a prior art oxygen separator configured to separate/concentrate oxygen from air. This separator is modified by the air separation unit 110 of this invention (FIGS. 2-5) and the blower driving system 210 of this invention (FIG. 4), as explained in detail below.

In essence, and with particular reference to FIG. 1, basic details of the oxygen separator 10 modified by the air separation unit 110 and blower driving system 210 of this invention are disclosed. The oxygen separator 10 includes an adsorber bed 20 including an adsorber material therein which preferentially adsorbs nitrogen, $CO_2$ and water over oxygen. A valve 30 is located downstream of the adsorber bed 20. A buffer tank 40 is provided downstream of the valve 30. A blower 50 defines a preferred form of pump located upstream of the adsorber bed 20. A controller 60 is coupled to the valve 30 and the blower 50 (or other pump) to control opening and closing of the valve 30 and to control a direction in which the blower 50 (or other pump) is operating, to either provide air into the adsorber bed 20 or pull a vacuum to desorb and remove nitrogen out of the adsorber bed 20. Normally, a heat exchanger is required between the blower and the adsorber bed to remove the heat generated when the air is compressed. The heat exchanger may be bypassed during the vacuum phase of the cycle.

With continuing reference to FIG. 1, details of the adsorber bed 20 are described. The adsorber bed 20 includes an enclosure 22 for containing the adsorber material. This enclosure 22 includes an inlet 24 spaced from an outlet 26. The inlet 24 and outlet 26 define preferred forms of first and second ports for access into the enclosure 22. The inlet 24 and outlet 26 normally are incorporated in closures or "end plates" which can be removed to allow access to the adsorption components in the enclosure 22. Otherwise, the enclosure 22 is preferably sealed to prevent leakage of gases into or out of the enclosure 22.

The adsorber material within the adsorber bed 20 could be any form of material which preferentially adsorbs nitrogen over oxygen. One such material is molecular sieve such as nitroxy siliporite. This material is preferably supplied in the form of beads which are either generally spherical in form or can be of irregular shape. Since the beads are composed of molecular sieve material within the enclosure 22, gaseous pathways extend through, between and around the adsorbent material.

Most preferably, a plenum is configured at the inlet and the outlet end of the adsorber bed to provide even gas flow across the cross section of the bed. In a preferred configuration, the inlet 24 is located below the outlet 26, and with the inlet 24 at a lowermost portion of the enclosure 22 and the outlet 26 on an uppermost portion of the enclosure 22. The enclosure 22 could have a variety of different shapes. In one embodiment, the enclosure 22 could be generally rectangularly shaped. The enclosure could be shaped like a pressure vessel to maximize an amount of vacuum to be drawn on the enclosure 22 while minimizing an amount of material strength (i.e. wall thickness or material choice) that must be designed into the enclosure 22. If the size of the adsorber material is sufficiently small to potentially pass through the inlet 24 or outlet 26, filters are provided at the inlet 24 and outlet 26 to keep the adsorbent material within the enclosure 22.

With continuing reference to FIG. 1, details of the valve 30 are described. The valve 30 is interposed on a line 32 extending from the outlet 26 of the adsorber bed 20 and extending to the buffer tank 40. This line 32 is preferably substantially rigid, especially between the valve 30 and adsorber bed 20, so that when a vacuum is drawn on the adsorber bed 20, the line 32 does not collapse. The valve 30 is preferably sealed to prevent leakage in any manner when in a closed position and to only allow passage of gas along the line 32 when in an open position.

The valve 30 is preferably coupled to a controller 60 which controls the opening and closing of the valve 30. Optionally, the valve 30 could have a controller built into the valve 30 that could be set a single time and then operate in accordance with its settings.

While the valve 30 would typically be programmed once and then operate in accordance with such settings, the valve 30 could optionally be controlled at least partially through a control system including sensors and feedback to the valve 30. For instance, an oxygen sensor could be provided adjacent the valve 30 or along the line 32 between the valve 30 and the adsorber bed 20 to detect oxygen concentration levels approaching the valve 30. Nitrogen adjacent the valve 30 would be indicative that the adsorbent material within the adsorber bed 30 is saturated with nitrogen and that the oxygen separator 10 needs to change operating modes, to have the blower 50 (or other pump) reverse to pull a vacuum and desorb nitrogen from the adsorber material and pull the nitrogen out of the adsorber bed 20 to recharge the system.

Normally control of the cycle is achieved with the use of pressure transducers which reverse the blower at appropriate times. Usually the purge cycle is initiated when the vacuum reaches a certain predetermined level. The valve 30 is then opened for a predetermined amount of time so that a purge layer of oxygen is allowed to purge the remaining nitrogen from the bed. So the pressure and vacuum cycle are determined by pressure and the purge portion of the cycle is timed.

Other sensors could also potentially be utilized to allow the oxygen separator 10 to operate most effectively. The valve 30 is preferably of a type which operates with a minimum of lubricant or which can operate with a lubricant which is compatible with the handling of oxygen. The valve 30 and other portions of the oxygen separator 10 are also preferably formed of materials which are compatible with the handling of oxygen. For instance, brass is often effective in handling of oxygen and so brass is one material from which the valve 30 could be suitably manufactured when the system 10 is used for oxygen separation.

With continuing reference to FIG. 1, details of the buffer tank 40 are described. The buffer tank 40 is not strictly required for operation of the system, but allows for the system in the form of the oxygen separator 10 to deliver oxygen substantially continuously, and to moderate pressure spikes in the system. The buffer tank 40 includes an enclosure 42 with an input 44 and an output 46 in FIG. 1. However, normally the buffer tank does not have a separate inlet and outlet. Since its purpose is simply to be an accumulator and minimize the pressure fluctuations inherent in the pressure swing adsorption process. The input 44 is coupled to the line 32 on a side of the valve 30 downstream from the adsorber bed 20.

The buffer tank 40 would typically have some form of regulator valve on the output 46 which would deliver oxygen out of the buffer tank 40 when oxygen is required by oxygen utilizing systems downstream of the buffer tank 40. The input 44 of the buffer tank 40 can remain in fluid communication with the valve 30. The buffer tank 40 can contain oxygen at above atmospheric pressure and at a pressure matching or slightly below an operating pressure of the adsorber bed 20 when the adsorber bed 20 is actively adsorbing nitrogen and oxygen flows into the buffer tank 40.

A sensor can be associated with the buffer tank 40 which cooperates with the controller 60 to shut off the oxygen separator 10 when the buffer tank 40 nears a full condition. In many applications a compressor is located downstream from the buffer tank 40 to fill oxygen vessels. When the vessels are full the system would be shut off. If required, a pressure regulator can also be provided on the output 46 of the buffer tank 40 so that pressure of oxygen supplied out of the buffer tank 40 remains substantially constant. Similarly, an oxygen pump could be provided downstream of the buffer tank 40 if the oxygen were required to be supplied at an elevated pressure above pressure within the buffer tank 40.

Most preferably, the buffer tank 40 is not a particularly high pressure tank so that the oxygen separator 10 including the blower 50 (or other pump) and adsorber bed 20 do not need to operate at a particularly high pressure when delivering oxygen to the buffer tank 40. By minimizing the pressure of the buffer tank 40, the weight of the buffer tank 40 (and other components of the system 10) can be significantly reduced. Furthermore, the power consumed by the blower is reduced as the pressure drop across the blower is reduced.

With continuing reference to FIG. 1, details of the blower 50 (or other pump) are described. This blower 50 generally includes a housing 52 with some form of prime mover therein coupled to a driver, such as an electric motor. The housing 52 of the blower 50 includes an entry 54 in direct access with a surrounding environment in a preferred embodiment. A discharge 56 is also provided on the housing 52 which is located on a side of the blower 50 closest to the adsorber bed 20.

The blower 50 is preferably in the form of a two or three lobed rotary blower coupled in direct drive fashion to an electric motor. In one embodiment the electric motor is a five horsepower three phase motor and the rotary blower is a two or three lobed blower and can deliver approximately one hundred cubic feet per minute when operating at atmospheric pressure. This rotary blower is also preferably configured to have acceptable performance when drawing a vacuum on the adsorber bed 20.

The lobes of the rotary blower are preferably configured so that they are of approximately similar efficiency in moving gases through the blower 50 between the entry 54 and the discharge 56 in either direction. In one form, the lobes are thus symmetrical in form so that they act on the air similarly in both directions of rotation for the blower 50.

The blower 50 is preferably substantially of a positive displacement type so that it maintains an adequate performance when drawing a vacuum on the adsorber bed 20 so that nitrogen can be effectively desorbed from the adsorber material in the adsorber bed 20 when the blower 50 is operating in a reverse direction to pull nitrogen out of the adsorber bed 20 and deliver the nitrogen out of the entry 54.

Most preferably, the blower 50 is coupled in direct drive fashion to the electric motor (or though a gear box). Most preferably, the electric motor is a three phase alternating current motor which can easily be reversed by reversing two of the phases. In this way, the controller 60 need merely reverse two poles of the three phase motor. In an other embodiment a direct current, permanent magnet may be used wherein the direction of the rotation can be reversed by reversing the polarity which in turn will reverse the rotation of the blower. Almost all three phase electric motors are capable of being reversed as above. Direct current motors are also readily available from many manufacturers which reverse their rotation direction by changing polarity.

Other types of pumps could alternatively be utilized for drawing air into the adsorber bed 20 and pulling nitrogen out of the adsorber bed 20 for the oxygen separator 10. For instance, such a pump could be a positive displacement pump, such as a piston pump or a peristaltic pump. Other forms of positive displacement pumps could also be utilized including gerotor pumps, gear pumps, etc. Other forms of pumps rather than strictly positive displacement pumps could also be selected, such as centrifugal pumps or axial flow pumps. The most efficient scheme for pumping the air into the system and exhausting the bed depends on the requirements of the final user.

With continuing reference to FIG. 1, details of the controller 60 are described according to a preferred embodiment. The controller 60 is shown as a separate unit coupled to the blower 50 (or other pump) through a blower signal line 62 and coupled to the valve 30 through a valve signal line 64. The controller 60 could in fact be integrated into the valve 30 or integrated into the blower 50 (or other pump) or be provided as a standalone unit such as depicted in FIG. 1. It is also understood that the controller 60 could be split into two (or more) separate devices, either separate from the blower 50 and valve 30 or integrated into both the blower 50 and valve 30.

The controller 60 provides the basic function of controlling a direction in which the blower 50 is operating and whether the valve 30 is open or closed. Control systems have been used which simply time the cycle. More often, the controller is configured to react to pressure or some other input.

A preferred sequence for directional control of the blower 50 and opening and closing of the valve 30 are described in detail below. The controller 60 could be in the form of a programmable logic device or could be in the form of an application specific integrated circuit, or could be in the form of a CPU of a special purpose computer or a general purpose personal computer or other computing device. The controller 60 could be configured to have operating parameters set at a central controlled location, such as during manufacture, or could be configured to allow for programming in the field before and/or during operation.

In use and operation, and with particular reference to FIG. 1, details of the operation of the oxygen separator 10 of the prior art are described. It will be understood that the separator 10 would operate similarly when separating other gases than when separating oxygen from air, and the operation as an oxygen separator 10 is provided merely as one example.

Initially, the system 10 is configured with the valve 30 closed and the blower 50 (or other pump) is caused to rotate in a direction driving gases out of the adsorber bed 20 (along arrow E). This is the vacuum cycle used to desorb nitrogen out of the beads in the bed 20. In particular, the blower 50 rotates to cause gases to be pulled into the entry 54 (along arrow E). This gas is removed from the bed 20 by the blower 50 and caused to pass through the discharge 54 away from the adsorber bed 20 along arrow F and to the surrounding atmosphere.

Nitrogen (or other undesirable gas) is adsorbed by the adsorber material within the adsorber bed 20. Most typically, the adsorber material also adsorbs water vapor and carbon dioxide, as well as potentially trace amounts of other gases, including pollutants.

During the last portion of the vacuum cycle valve 30 is opened to allow a small amount of the contents of the buffer tank to be introduced into the adsorber bed. This step is called the "purge phase." The purge phase is used to purge nitrogen (as well as some carbon dioxide and water out of plumbing lines and free space between the valve 30 and the blower 50, but not appreciably out into the surrounding atmosphere. This short purge phase is typically timed to match an amount calculated or determined by experiment, but could also be ended based on sensor readings. This purge phase ends the vacuum cycle and precedes the adsorption cycle to follow.

The blower is then reversed to commence the adsorption cycle. Air is drawn into the blower at the inlet 54 port of the blower 50 (in the direction shown by arrow A). The air flows (along arrow B) into the adsorber bed 20 where nitrogen, carbon dioxide, and water are preferentially adsorbed. The gas not adsorbed in the adsorber bed (normally a mixture of oxygen and argon) is passed through valve 30 into the buffer tank 40.

The adsorber bed 20 might also adsorb oxygen to some extent. However, the adsorber material is selected so that it preferentially adsorbs nitrogen more than oxygen. Due to the presence of the adsorber material within the adsorber bed 20, substantially only oxygen (or other desirable gas) can leave the adsorber bed 20 through the outlet 26. Typically, argon also remains with the oxygen. Because air is approximately 1% argon and approximately 20% oxygen, this twenty to one ratio typically causes the gases being discharged from the adsorber bed 20 at the outlet 26 to be approximately 95% oxygen and 5% argon.

Because the valve 30 is opened, this oxygen can flow (along arrow C) through the valve 30 and into the buffer tank 40. The buffer tank 40 is thus charged with oxygen. If oxygen is desired, it can be discharged from the buffer tank 40 output 46 (along arrow D). The adsorber material within the adsorber bed 20 eventually becomes saturated with nitrogen and other compounds, such as water vapor and carbon dioxide. The point of such saturation can be calculated in advance and calibrated into the separator 10. Alternatively, a sensor can be provided, such as along the line 32 adjacent the valve 30, to sense for nitrogen or other contaminants within what should be substantially only oxygen and argon. Such a sensor can cause the system to detect such saturation of the adsorbent material within the adsorber bed 20 and thus change the mode of operation of the oxygen separator 10 from the adsorption cycle to the vacuum cycle. Other sensors to trigger the change could be pressure sensors or volumetric flow rater sensors either alone or in combination with a clock or a calibration table. The goal is to prevent nitrogen or other contaminates from passing the valve 30 after adsorption bed 20 saturation.

When such saturation has either been sensed as occurring or predicted to occur, the separator 10 changes operation modes by closing the valve 30. Then the blower 50 (or other pump) reverses its direction of operation. For instance, the controller 60 can reverse two of the three phases of a three phase electric motor coupled to the blower. The blower 50 is then caused to turn in an opposite direction and begins pulling gas (along arrow E) out of the adsorber bed 20 and into the blower 50 from the discharge 56 and out of the blower 50 through the entry 54 and out into a surrounding environment, as a repeat of the vacuum cycle described above.

The controller 60 can be programmed with a typical amount of time required to effectively desorb the nitrogen from the adsorbent material within the adsorber bed 20. Normally, the controller 60 senses a threshold low pressure in the adsorber bed 20. The system operation then continues as described above with a short purge phase followed by return to the desorption cycle.

This operating sequence for the oxygen separator 10 can repeat itself potentially indefinitely. When the buffer tank 40 becomes full (or vessels being filled from the buffer tank 40 are full), an appropriate sensor associated with the buffer tank 40 can indicate that it is full and shut off the oxygen separator 10. As further amounts of oxygen are sensed as being needed, such as by a drop in pressure in the buffer tank 40, a signal can be sent to the controller 60 to again cause the system to commence operation.

With this invention a modified air separation unit 110 implements a modification of the prior art single bed reversing blower (SBRB) vacuum swing adsorption (VSA) oxygen separator 10 through the air separation unit 110 of this invention and the driving system 210 described in more detail below. The SBRB VSA air separation unit (ASU) 110 is modified in this exemplary ASU 110 to include a purge recovery tank 160. Many other portions of the ASU 110 have analogs in the prior art SBRB VSA technology such as that shown in FIG. 1.

Figure 2:
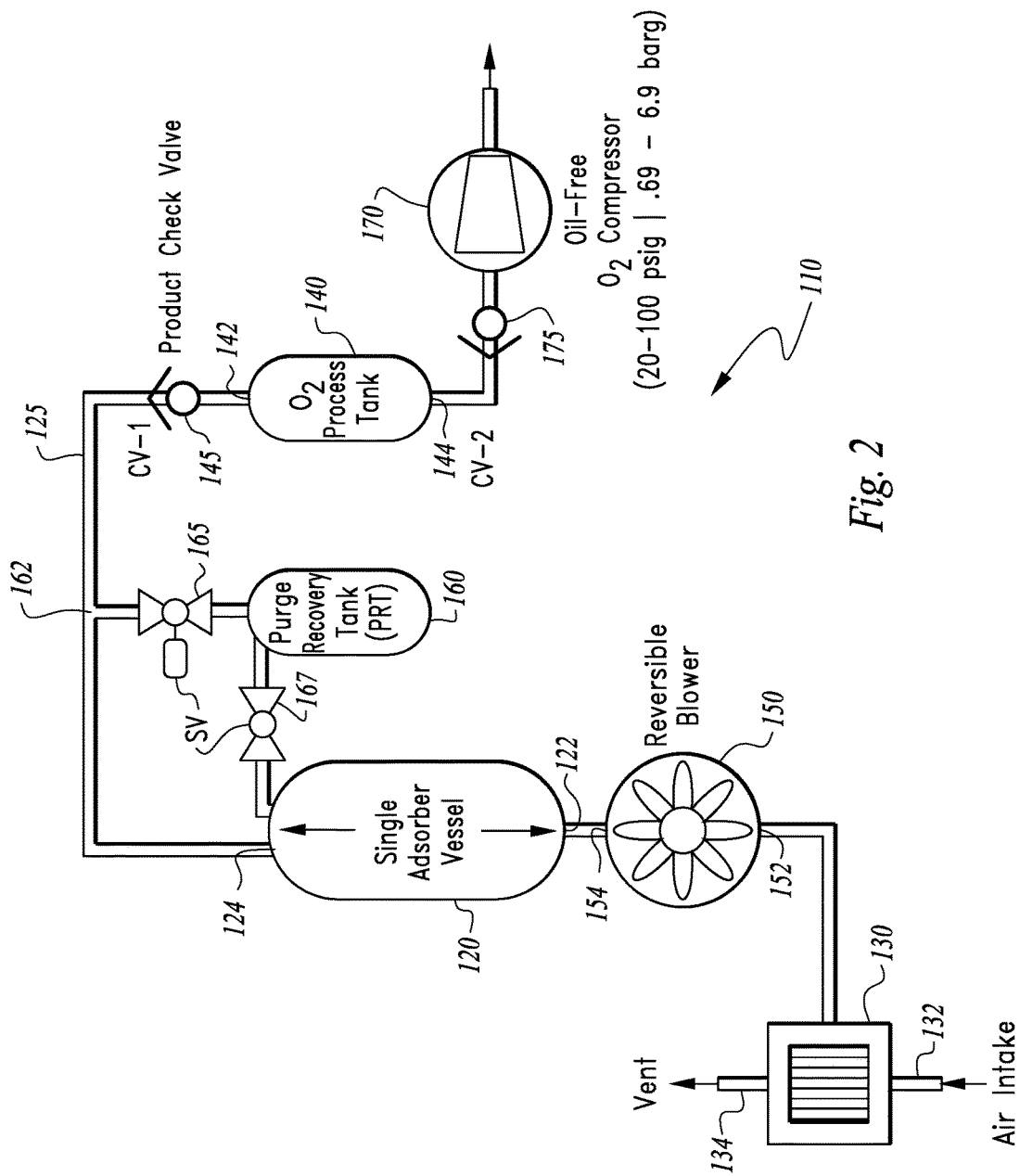
FIG. 2 is a schematic of a SBRB VSA ASU incorporating a purge recovery tank therein to enhance performance of the ASU and defining a modified vacuum swing adsorption air separation process according to this invention.

In essence, and with particular reference to FIG. 2, basic details of the ASU 110 are described, according to a preferred embodiment with the ASU 110 also typically including many of the details of the oxygen separator 10 as described above. A single adsorber vessel 120 is fed by an intake 130 which supplies air to the vessel 120. Downstream of the vessel 120, an $O_2$ supply line 125 leads to an $O_2$ process tank 140 which is optionally provided to contain excess $O_2$ before it is utilized by equipment and/or for processes downstream of the $O_2$ process tank 140. A reversible blower 150 is interposed between the adsorber vessel 120 and the intake 130. A purge recovery tank 160 is coupled to the $O_2$ supply line 125 downstream of the vessel 120, preferably through a control valve 165 to control whether the purge recovery tank 160 is open or closed. A compressor 170 is preferably provided downstream of the $O_2$ process tank which can control pressure of $O_2$ supplied from the ASU 110.

More specifically, and with continuing reference to FIG. 2, specific details of the ASU 110 are described. The single adsorber vessel 120 extends between an inlet 122 and an outlet 124, with the inlet 122 defining a side of the vessel 120 closest to the intake 130 and the outlet 124 on a side of the vessel 120 opposite the inlet 122. This vessel 120 can have any of a variety of configurations. While this vessel 120 is described as a single adsorber vessel 120, it is conceivable that a manifold upstream and downstream of the single adsorber vessel 120 could be provided so that multiple vessels 120 could be provided in parallel, but operating in unison so that the ASU 110 is still functioning as a single bed reversing blower (SBRB) system but with optionally additional vessels 120 merely to adjust size of the vessel 120.

The vessel 120 contains an adsorption material which preferentially adsorbs $N_2$ over $O_2$. This material is typically provided in the form of beads or other solid media which allow for gas to flow about the solid media as the gas extends from the inlet 122 to the outlet 124, and past surfaces of the adsorption material. Surfaces of the adsorption material adsorb nitrogen thereon, allowing $O_2$ to pass through the vessel 120. Typically, the material within the vessel 120 also adsorbs water vapor and various other gases, while typically argon within the air is not adsorbed but passes out of the vessel 120 along with the oxygen. The vessel 120 includes a container wall which is sufficiently strong so that it can maintain its volume when experiencing pressures ranging from near vacuum at a low end to approximately atmospheric (but potentially slightly higher than atmospheric pressure) at a high end.

The intake 130 in a simplest form merely includes an opening which is open to a surrounding atmosphere for intake of air into the ASU 110. In the embodiment depicted, the intake 130 can include some form of filter element, such as a particulate filter and includes an air port 132 spaced from a purge port 134. A valve within the intake 130 causes air to be drawn in through the air port 132 when the blower 150 is drawing air into the vessel 120, and the purge port 134 discharges gas (including mostly $N_2$) when the blower 150 has reversed and is pulling gas out of the vessel 120. The purge port 134 is preferably spaced from the air port 132 to minimize the potential for nitrogen exhaust to find its way back into the air port 132. If desired, the purge port 134 can lead to other equipment such as nitrogen recovery equipment.

Figure 4:
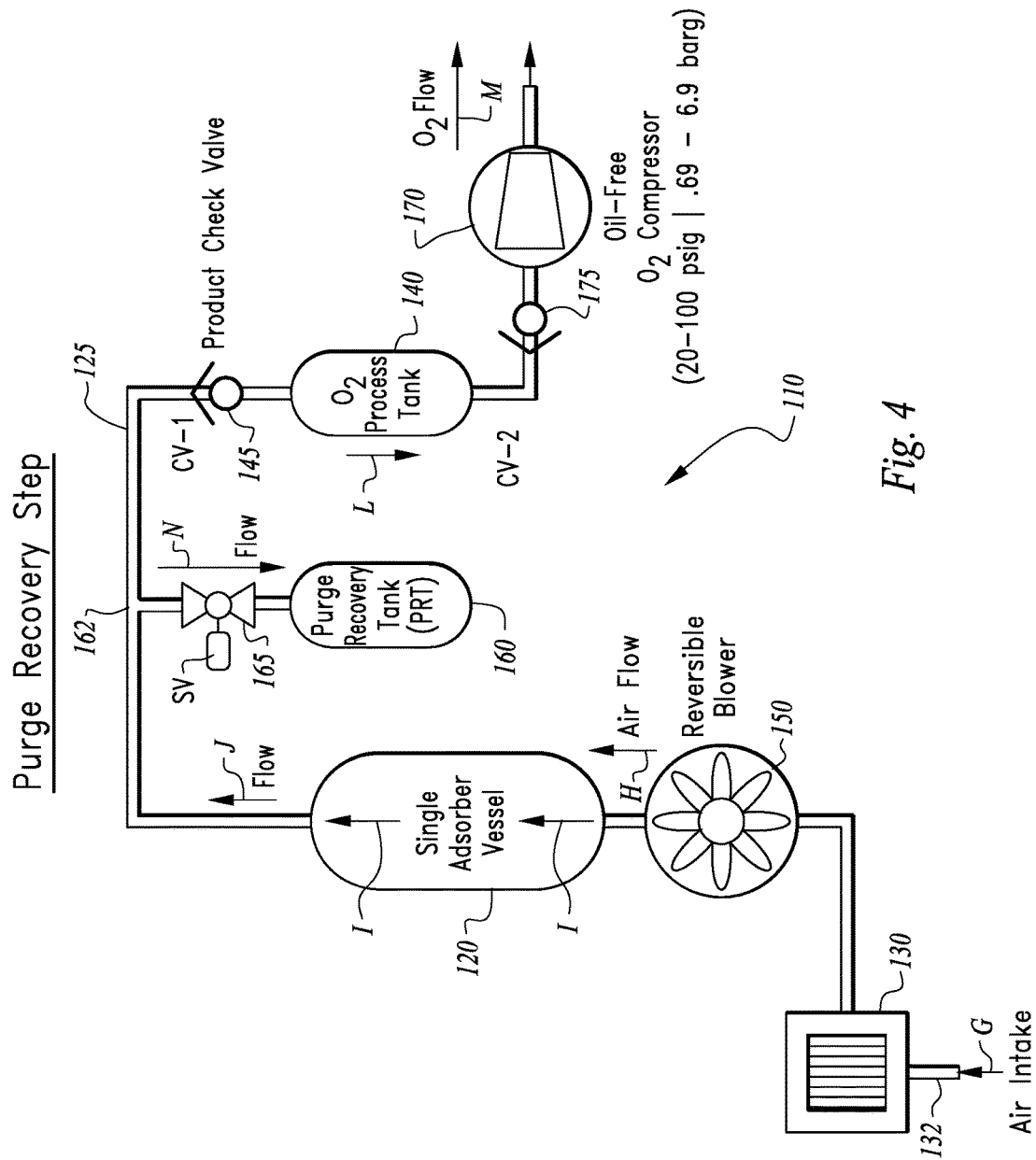

Regions downstream of the vessel 120 are together generally referred to collectively as the $O_2$ output in that gas of mostly $O_2$ remains in these portions of the ASU 110. The $O_2$ process tank 140 could be avoided in systems where oxygen is used as it is produced or where discharge of excess $O_2$ beyond that utilized by the equipment downstream of the ASU 110 can merely be discharged to atmosphere, or can be avoided in systems where downstream equipment from the ASU 110 itself includes appropriate volume, such as in the form of tanks or other equipment so that the $O_2$ process tank 140 is not needed. However, typically an $O_2$ process tank 140 is provided to hold excess $O_2$ produced when the reversible blower 150 is driving air into the vessel 120 and the ASU 110 is producing $O_2$, so that when the blower 150 reverses and the vessel 120 is in recovery mode and discharging nitrogen therefrom, $O_2$ can continue to be supplied from the $O_2$ process tank 140 to supply downstream oxygen utilizing equipment (FIG. 4).

Most preferably, a product check valve 145 is provided upstream of the $O_2$ process tank 140. This check valve 145 acts to keep pressurized oxygen within the $O_2$ process tank 140 and preventing back flow of oxygen back toward the vessel 120. This product check valve 145 also provides one form of valve within the $O_2$ supply line 125 which the reversible blower 150 works against so that at least partial vacuum can be drawn on the vessel 120, without significant leakage of any gases into the vessel 120 from the $O_2$ supply line 125. Such a vacuum is needed to allow for recovery of the material within the vessel 120 by causing the material to give up the $N_2$ and return to a state where it is ready to again preferentially adsorb $N_2$ and supply $O_2$ to the $O_2$ process tank 140. The $O_2$ process tank 140 includes an inlet 142 opposite an outlet 144 with the inlet 142 adjacent to the product check valve 145 and the outlet 144 leading further into equipment downstream of the ASU 110 which utilize oxygen.

The reversible blower 150 includes an inlet 152 on a side of the reversible blower 150 closest to the intake 130 and an outlet 154 on a side of the reversible blower 150 opposite the inlet 152. This reversible blower 150 is preferably a positive displacement pump, most typically of a rotary lobe variety which can both efficiently blow air through the vessel 120 to produce oxygen, but also effectively draw a vacuum on the vessel 120 when reversed. The motor coupled to the rotary lobe prime mover of the reversible blower 150 is most preferably a type of electric motor which can readily be reversed in direction, such as by reversing a polarity of an electric field associated with the electric motor, or some other type of electric motor which can be readily reversed in the direction that it is operating with a minimum of stress on the equipment associated with the reversible blower 150. Typically, a controller is coupled to the reversible blower 150 which sends a signal at an appropriate time to the reversible blower 150 to cause it to reverse from pushing air into the vessel 120 to pulling gas out of the vessel 120.

The purge recovery tank 160 is preferably provided with an opening thereinto coupled to the $O_2$ supply line 125, preferably at a junction 162 between the outlet 124 of the vessel 120 and the product check valve 145. As an alternative, the purge recovery tank 150 can be coupled directly to the adsorber vessel 120 typically at a portion of the adsorber vessel 120 on a side of the vessel 120 opposite the inlet 122.

A control valve 165 is interposed between the tank 160 and the $O_2$ supply line 125. Alternatively, this control valve 167 can be interposed between the tank 160 and the vessel 120. In either configuration, the control valve 165, 167 transitions from a closed state where the purge recovery tank 160 is isolated from the $O_2$ supply line 125 and the adsorber vessel 120 and an open state where the purge recovery tank 160 is open to the $O_2$ supply line 125 and/or adsorber vessel 120. The control valve 165, 167 is typically coupled to a servo motor so that it is in the form of a servo valve (SV).

The control valve 165 is coupled to a controller which can be coupled to or the same as the controller associated with the reversible blower 150, so that opening and closing of the purge recovery tank 160 occurs in a synchronized fashion with reversing of the reversible blower 150. If desired, such a controller or group of controllers can also be coupled to sensors such as a nitrogen sensor which can detect trace amounts of $N_2$ downstream of the vessel 120 and indicative that the material within the vessel 120 is approaching saturation and the need to enter a recovery phase by reversing the reversible blower 150 and drawing nitrogen out of the vessel 120 through drawing a vacuum within the vessel 120. The controller can optionally include a clock and reverse the blower (and open/close the valve 165, 167) after set amounts of time have passed.

The compressor 170 is optionally provided downstream of the $O_2$ supply line 125 and downstream of any $O_2$ process tank 140. Preferably a compressor check valve 175 is provided upstream of the compressor 170. The compressor 170 allows for control of a pressure desired for $O_2$ supplied from the ASU 110. The compressor check valve 175 assists in keeping $O_2$ downstream of the compressor 170 from backing up into the ASU 110.

Figure 3:
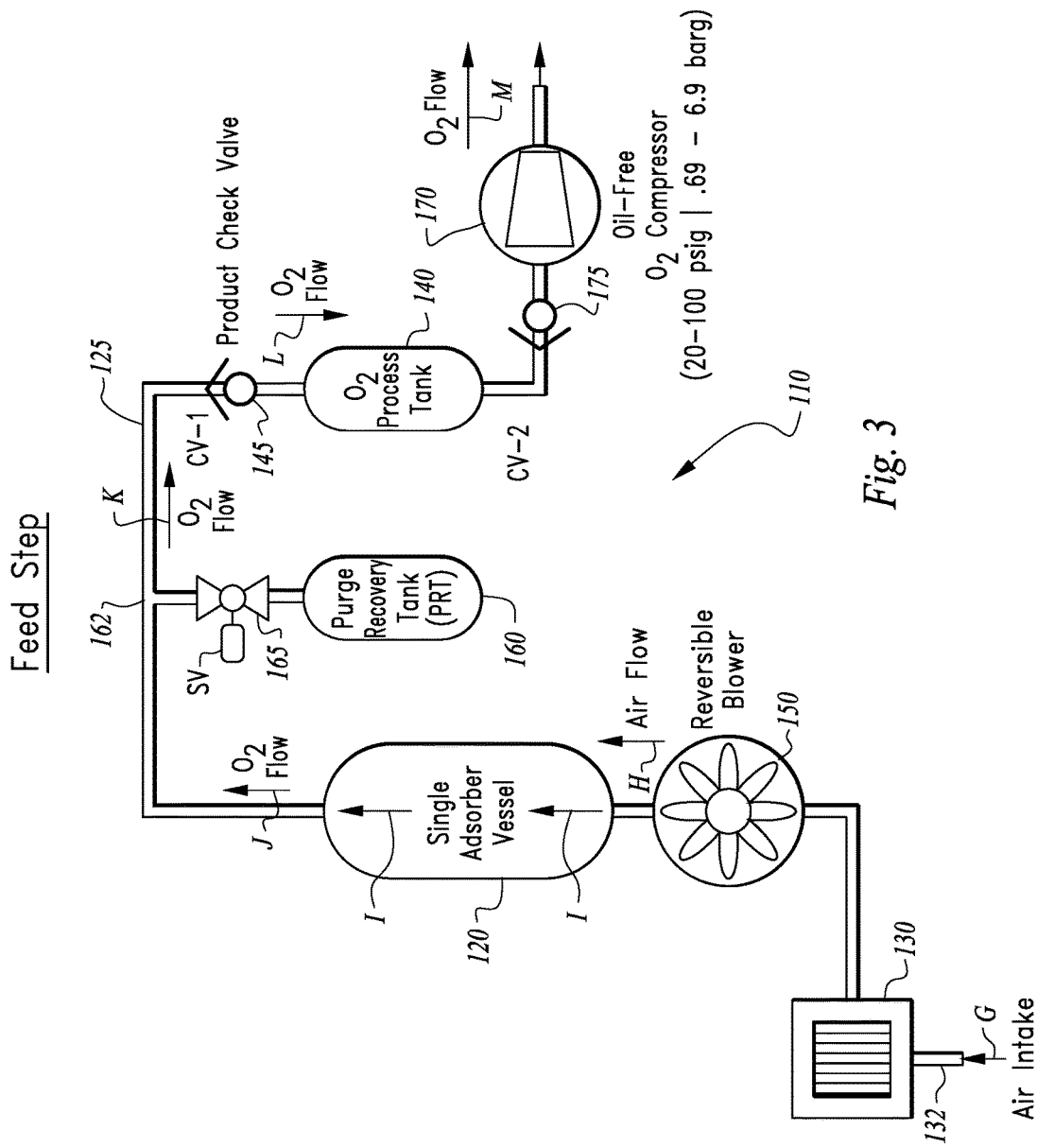
FIGS. 3-5 are schematics similar to that which is shown in FIG. 2, but with various different arrows depicting various steps in the operation of the reversing blower VSA ASU according to this invention.
Figure 5:
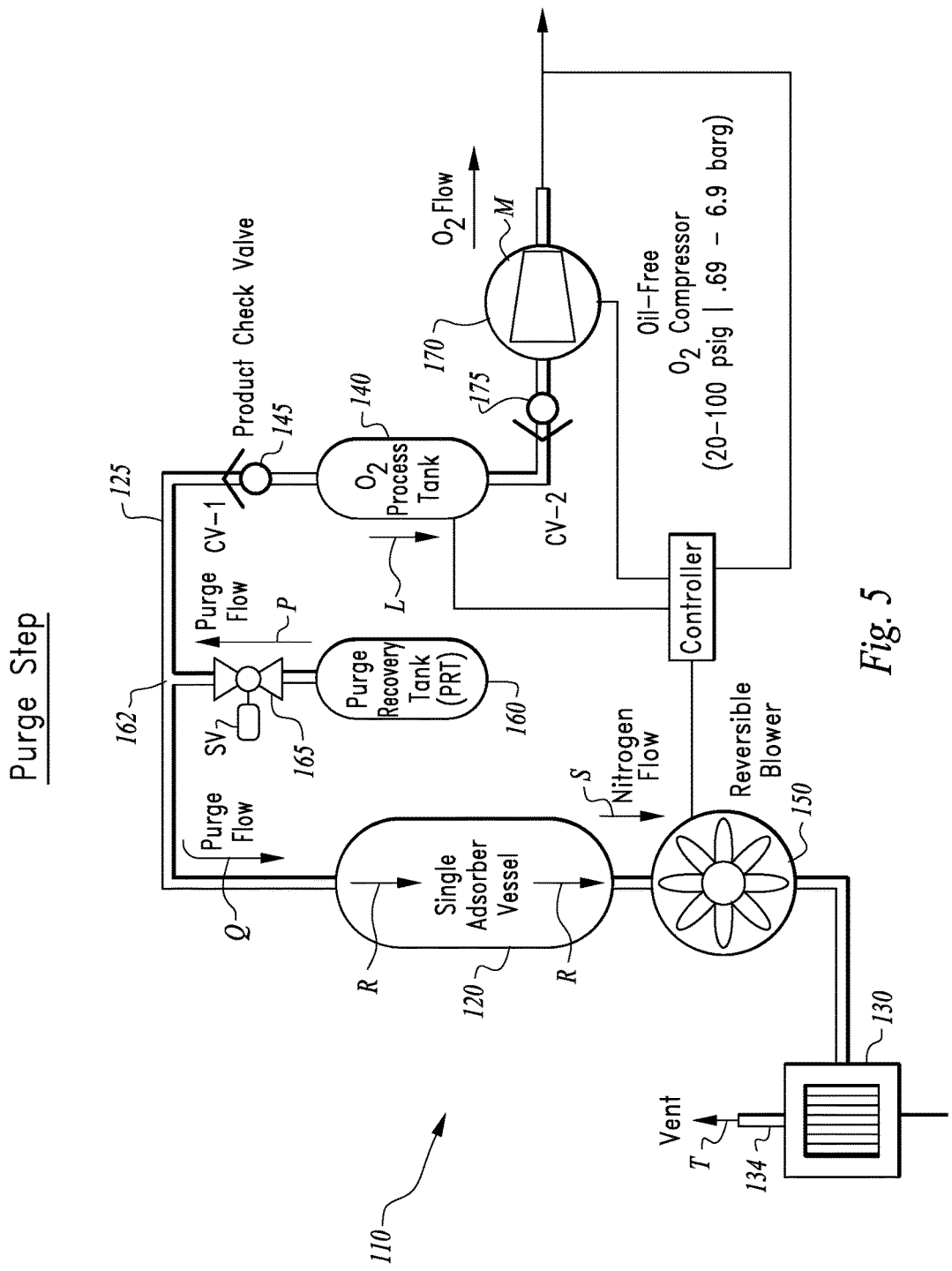

With particular reference to FIGS. 3-5, general steps in operation of the ASU 110 are described. FIG. 3 depicts a feed step for the ASU 110. In this step the reversible blower 150 draws air from the air intake 130 through the air port 132, along arrow G. The blower 150 drives air along arrow H into the vessel 120. The air passes through the vessel 120 (along arrow I) where nitrogen is selectively adsorbed. Gas of mostly $O_2$ flows out of the vessel 120 (along arrow J) and within the $O_2$ supply line 125. The control valve 165 of the purge recovery tank 160 is closed during the beginning of the feed step so that $O_2$ flow continues past the junction 162 and through the $O_2$ supply line 125 (along arrow K). The oxygen then passes through the product check valve 145 and into the $O_2$ process tank 140 (along arrow L). Further, the $O_2$ can flow through the compressor check valve 175 and through the compressor 170 for discharge from the ASU 110 (along arrow M).

Such a feed step (as depicted in FIG. 3) continues as long as the material within the vessel 120 has excess capacity for adsorption of nitrogen. When this adsorption material within the vessel 120 becomes saturated with nitrogen, the ASU 110 needs to prepare for recharging the adsorption material within the vessel 120. To detect that such recharging/restoration of the material within the vessel 120 is needed, the ASU 110 can follow a timing circuit or follow gas flow valves which measure an amount of gas flow, or can include a nitrogen sensor or other sensor downstream of the vessel 120 which indicate that the gas downstream of the vessel 120 is indicative that recharging/reconditioning of the material within the vessel 120 is needed.

Preparation for recovery of the material within the vessel 120 can occur in a couple of slightly different but closely related ways. In one embodiment, such preparation begins by opening of the control valve 165 (or valve 167). The interior of the pressure recovery tank 160 preferably has pressure below atmospheric pressure so that gas of mostly oxygen (but with perhaps some nitrogen present) flows quickly into the purge recovery tank 160 through the control valve 165.

When the purge recovery tank 160 is full, or when the purge recovery tank 160 is achieving a fill level which is sufficiently great to satisfy its purposes in purge recovery for the vessel 120, the control valve 165 is closed. The purge recovery tank 160 thus contains and holds a charge of mostly $O_2$ (but typically with some $N_2$ and other contaminates present) as a purge charge which can be at near atmospheric pressure, or conceivably above atmospheric pressure if pressure downstream of the vessel 120 is above atmospheric pressure.

The reversible blower 150 is instructed to reverse so that air is no longer driven into the vessel 120, but the blower 150 reverses and gases begin to be pulled out of the vessel 120, through the reversible blower 150 and back to the intake 130. The precise moment of beginning reversing of the reversible blower 150 could be before the control valve 165 associated with the purge recovery tank 160 has closed, or could be at the same time that the control valve 165 closes, or could be slightly after the control valve 165 closes. The reversible blower 150 typically takes some time to stop moving in a forward direction and then begin moving in a reverse direction. This slow down to zero velocity and speed up in a reverse direction also define a time period which can be during which the control valve 165 closes or immediately before or immediately after the control valve 165 closes.

The reversible blower 150 then operates in a reverse direction drawing a vacuum on the adsorber vessel 120 and portions of the $O_2$ supply line 125 between the adsorber vessel 120 and the product check valve 145 or other valve on the $O_2$ supply line 125 which resists the draw of vacuum within the $O_2$ supply line 125. Pressure is thus reduced within the $O_2$ supply line 125 and the adsorber vessel 120. Gas flow through the vessel 120 occurs along arrow R of FIG. 5. As the pressure is reduced within the adsorber vessel, the ability of the material within the vessel 120 to hold $N_2$ decreases. $N_2$ is thus released from the adsorber material and flows, along arrow S (FIG. 5) through the reversible blower 150 and out of the purge port 134 of the intake 130 (along arrow T of FIG. 5). After a sufficient amount of time and sufficiently low pressure is achieved within the vessel 120 to satisfactorily allow the material within the vessel 120 to recover, the ASU 110 then undergoes preparation for re-reversing the reversible blower 150 and returning the ASU 110 back to the feed mode (FIG. 3). This preparation typically initially involves opening of the control valve 165 (or valve 167) associated with the purge recovery tank 160. The mostly $O_2$ (with some $N_2$) gas that has been stored therein is thus released through the control valve 165 and into the $O_2$ supply line 125 (or directly into the vessel 120 through the valve 167 of FIG. 2).

This purge of mostly $O_2$ with other gases into the low pressure vessel 120 allows for pressure within the vessel 120 to be quickly restored and also for the low quality purge gas which contains some $N_2$ and other contaminant gases therein to again contact the adsorption material within the vessel 120 for removal of $N_2$ and other contaminants therefrom. Such purge flow is generally depicted by arrow P and also be arrow Q for return back into the adsorber vessel 120 (FIG. 5).

The vessel 120 has thus been fully prepared for returning back to the feed step. The reversible blower 150 can then be re-reversed to again drive airflow (along arrow H of FIG. 3) from the intake 130 (along arrow G) and through the vessel 120 (along arrow I). The control valve 165 with the purge recovery tank 160 can be closed just before the reversible blower 150 re-reverses, at the same time that the reversible blower 150 re-reverses, or shortly after the reversible blower 150 re-reverses.

Various factors such as the volume of gas which can reside within the various lines adjacent to the purge recovery tank 160 and whether the ASU 110 is to be optimized for $O_2$ purity, energy efficiency, or production rate, can be factored into determining precisely when the control valve 165 (or 167) should be returned to its closed state. Similar optimization can occur when determining when to initially open the control valve 165 and also when to initially close the control valve 165. The control valve 165 is re-closed so that it maintains a vacuum therein to make the purge recovery tank 160 most effective when it is again utilized in the next iteration of the cycle performed by the ASU 110.

Figure 6:
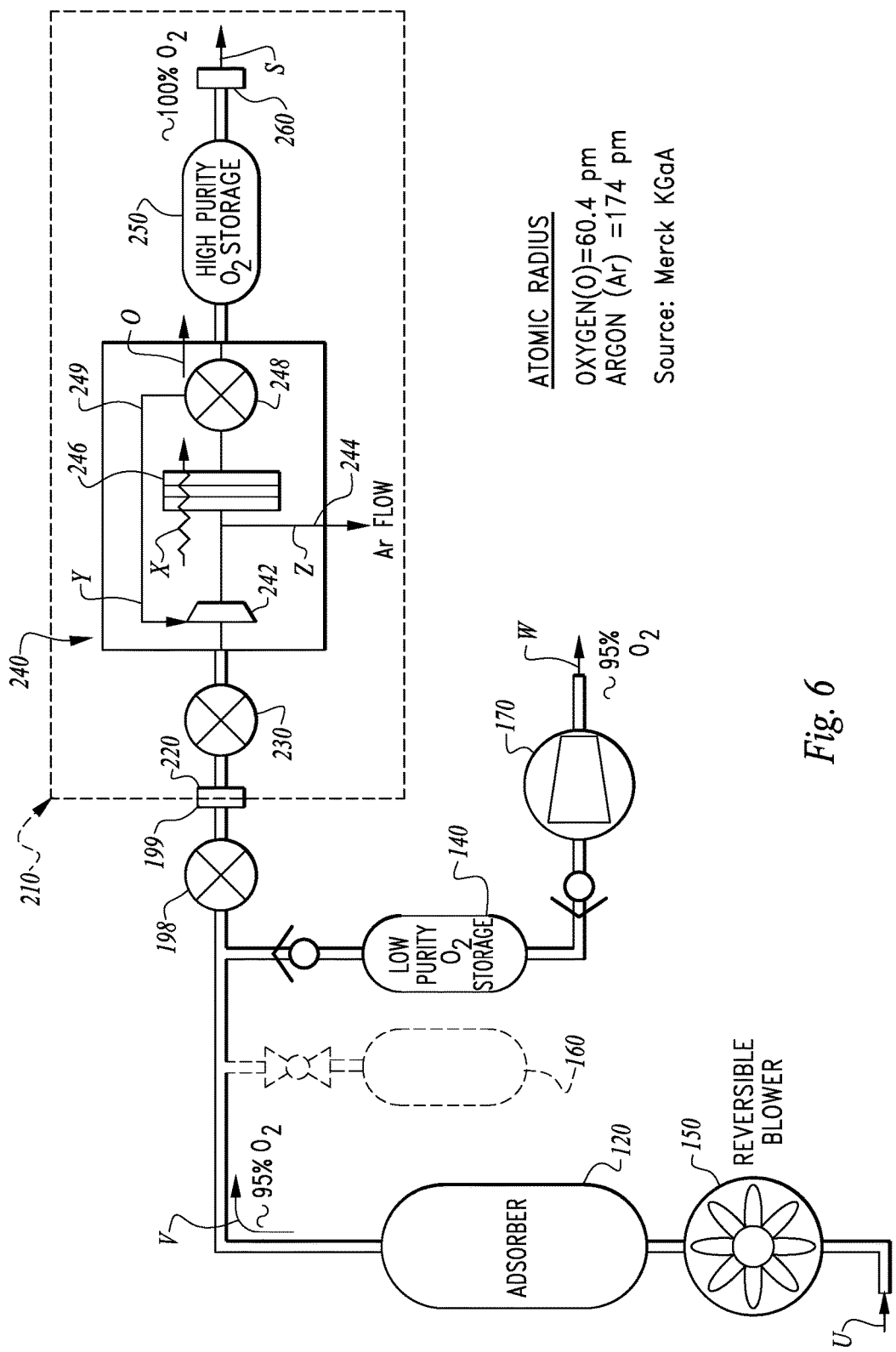
FIG. 6 is a schematic diagram of an adsorption based ASU according to one embodiment of this invention which utilizes a SBRB VSA system on a front end, followed by a selective membrane high purity separator to allow for high purity oxygen discharge from the system.

With particular reference to FIG. 6, details of a selective membrane high purity separator 210 added downstream from the air separation unit 110 (FIGS. 2-5) or optionally combinable with the prior art system 10 (FIG. 1), is disclosed according to one embodiment. An oxygen and argon output downstream of an adsorber 120 of the air separation unit 110 (FIG. 5) is provided with piping leading to a shutoff valve 198 ahead of an interface 199 to which further additional equipment can be modularly attached.

Figure 7:
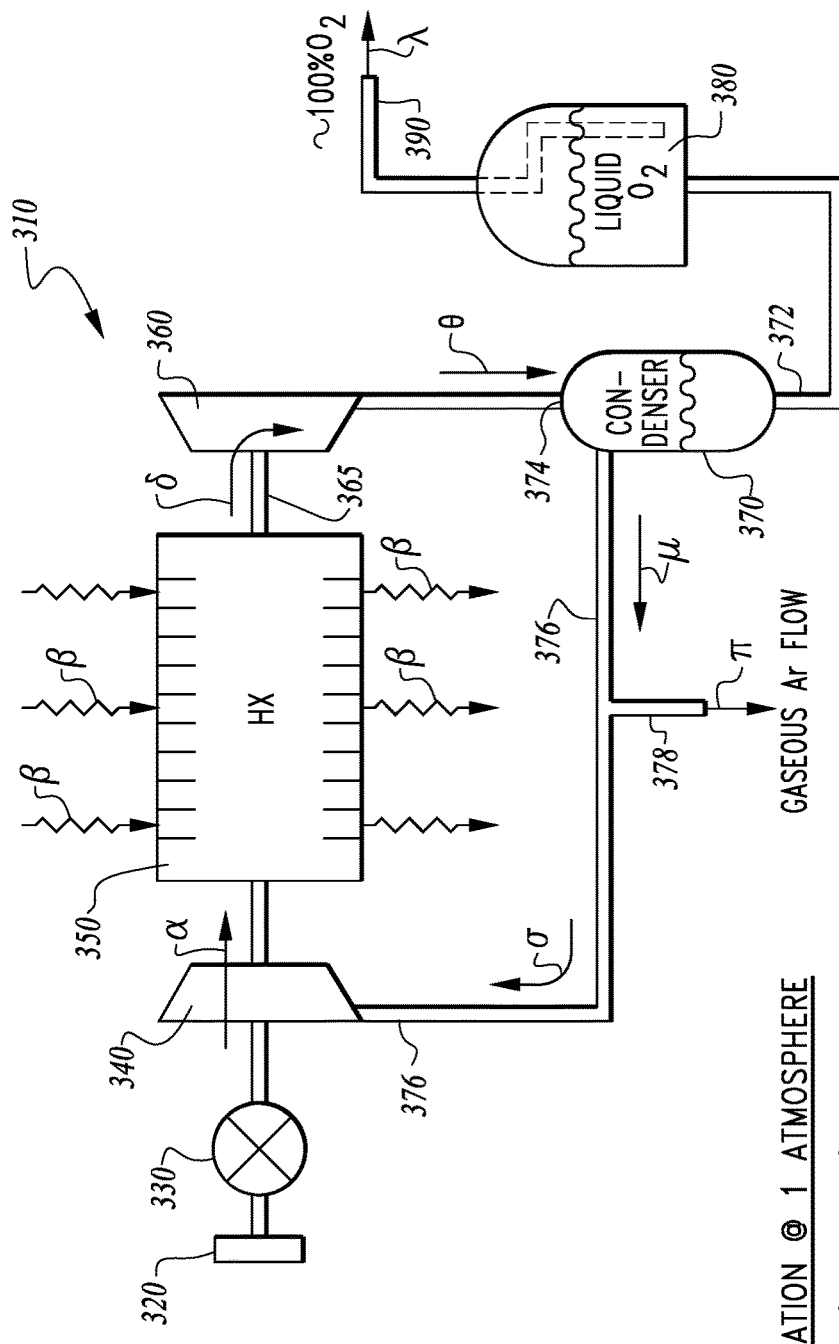
FIG. 7 is a schematic of an alternative high purity separator utilizing cryogenic cooling to liquefy at least a portion of oxygen to provide high purity oxygen in a liquid or gaseous state therefrom, either as an alternative to the high purity separation of FIG. 6 or following the high purity separator.

One example of such a modular oxygen and argon separation system which could connect through this interface 199 is the selective membrane high purity separator 210. Another option would be a cryogenic high purity separator 310 (FIG. 7). Other portions of the air separation unit 110 (FIG. 5) are generally configured to operate consistent with previously described systems. In particular, air enters the system along arrow U of FIG. 6, passes through the reversible blower 150, and then through the adsorber 120. A gas of approximately ninety-five percent oxygen passes out of the adsorber 120 into an oxygen and argon output, along arrow V of FIG. 6. This gas in the oxygen and argon output is typically ninety-five to ninety-six percent oxygen and four to five percent argon. A purge recovery tank 160 can optionally be provided within the oxygen and argon output region, as well as a low purity $O_2$ storage 140 and a compressor 170 for discharge of low purity oxygen, along arrow W of FIG. 6.

Upstream (or optionally downstream) of the low purity $O_2$ storage 140, a shutoff valve 198 is provided which can be closed when the system 110 (FIG. 5) is to be operated without any high purity separator 210, 310. An interface 199 is provided downstream of the shutoff valve 198. This interface 199 leads to an inlet 220 into the selective membrane high purity separator 210 (FIG. 6) in this first embodiment.

The inlet 220 leads to a valve 230 which is optionally but preferably provided to act as a back flow valve to keep oxygen from backing up into other portions of the system 110 upstream of the high purity separator 210. A membrane unit 240 is provided downstream of this valve 230. The membrane unit 240 is some form of filter which selectively filters argon from oxygen, either by allowing oxygen to pass through the filter but not argon, or vice versa. In one embodiment, this filter is in the form of a molecular sieve which allows one of the oxygen and argon molecules to pass through, more readily than the other.

For instance, a barrier formed of hollow fiber membranes can be used which are optimized to allow oxygen to pass through, but not argon. Such filtration can rely on the difference in atomic radius of oxygen, 60.4 pm (picometers) and argon, 174 pm (source: Merck KGaA). Oxygen gas is typically a diatomic molecule ($O_2$). If beneficial for filtration, the $O_2$ molecule can be converted by heat or ionization techniques to be more atomic or the filter can differentiate between the $O_2$ molecule and the argon atom.

The molecule which cannot pass through the molecular sieve leads to an outlet, such as the argon outlet 244. The gas which can pass through the filter 246, such as a hollow fiber membrane which allows oxygen permeate to pass more readily therethrough than argon, passes along arrow X. This gas can be exclusively oxygen or can merely have a greater concentration of oxygen than an amount of oxygen in the flow upstream of the membrane 246.

A valve 248 is preferably provided downstream of the membrane 246 which can be adjusted to allow for high purity oxygen to flow therethrough (along arrow O to a high purity oxygen storage 280). A compressor 260 or merely a valve can lead to a high purity oxygen supply, along arrow S. The valve 248 can also be configured as a control valve so that it selectively allows for recirculation of the permeate, along a recirculation line 249, and along arrow Y back to the compressor 242. The compressor 242 supplies sufficient pressure to drive oxygen permeate through the membrane 246, along arrow X. By closing the valves 230 and 248 (at least partially), and allowing for ongoing recirculation driven by the compressor 242, higher and higher purity oxygen can be achieved. The valve 248 can then be opened to discharge this high purity oxygen along arrow O to the high purity oxygen storage 250 and for later output along arrow S.

With particular reference to FIG. 7, an alternative module in the form of a cryogenic high purity separator 310 can be provided in place of the membrane high purity separator 210. As an alternative, these two modules 210, 310 could be oriented successively, such as with the cryogenic high purity separator 310 having its inlet 320 coupled to the delivery control output 260, along arrow S.

The cryogenic high purity separator 310 sufficiently cools the oxygen and argon mixture to at least partially liquify the oxygen. The mixed gas is brought in through the inlet 320, and then through a valve 330 preferably provided to selectively close off access through the inlet 320 (or as a check valve to prevent back flow). A compressor 340 is provided downstream of the valve 330. An intercooler 350 is provided downstream of the compressor 340. This intercooler 350 is a heat exchanger which preferably utilizes airflow (but could utilize water flow or some other heat transfer fluid flow) over pathways for the mixed gas leaving the compressor 340 to remove heat of compression.

The cooled and compressed gas mixture is then expanded through the expander 360. This expander 360 is in one embodiment a turbine which has a driveshaft 365 thereof coupled back to the compressor 340 to at least partially power the compressor 340. Alternatively, the turbine 360 could provide output power from the system or power some other portion of the system.

The expander 360 could alternatively be a valve, a nozzle or some other constriction in the mixed gas flow piping which defines a transition between higher pressure upstream and lower pressure downstream of this constriction. In the lower pressure downstream area, the mixed gas is brought to a lower temperature. With sufficient compression through the compressor 340 and inter-cooling through the heat exchanger 350, and sufficient expansion through the expander 360, the oxygen is at least partially caused to condense into a liquid which can collect within a condenser 370.

The condenser 370 has a liquid outlet 372 for passage of liquid oxygen out of the condenser 370. A gas outlet 374 is provided for remaining gases, typically in the form of a combination of argon and oxygen which has not condensed into a liquid. This gas outlet 374 can lead to a recirculation line 376 which routes back to the compressor 340, and with an argon tap 378 diverging off of the recirculation line 376. This argon tap 378 would typically not be pure argon, but would remove some of the gas to maintain its flow balance when new gas is also being brought into the cryogenic high purity separator 310 through the inlet 320. If desired, the valve 330 could be closed and multiple repeated cycles of gas can pass through the recirculation line 376 along with the compressor 340, heat exchanger 350 and expander 360 until condensation temperatures are achieved and liquid oxygen is caused to be collected within the condenser 370. Downstream of the liquid outlet 372 a liquid oxygen storage 380 is preferably provided. An oxygen delivery 390 is provided downstream of the liquid oxygen storage which could provide either liquid or gaseous oxygen which is typically high purity, approximately one hundred percent oxygen.

Flow through the cryogenic high purity separator 310 is depicted with a series of arrows. Initially, arrow α depicts flow of mixed oxygen and argon gas passing through the compressor 340 and into the heat exchanger 350. Cooling air passes along arrow β, which could alternatively represent cooling water or other cooling fluid. The pressurized and cooled mixture of oxygen and argon would then pass along arrow δ through the expander 360. Finally, the gas mixture including condensing liquid oxygen passes along arrow θ into the condenser 370. Liquids pass out of the condenser 370 and into or through the liquid oxygen storage 380 and potentially through the oxygen delivery 390, along arrow λ. Gas remaining in the condenser 370 is discharged along the recirculation line 376 initially along arrow µ, with an argon tap allowing for argon and some oxygen to be removed, along arrow π. Further gaseous oxygen and argon is preferably rerouted along arrow σ back to the compressor 340. The cycle can then be repeated to liquefy and separate further oxygen.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. An oxygen separator, comprising in combination:
a reversible blower adjacent to an adsorption bed;
said reversible blower having a forward production mode where said reversible blower drives air through the reversible blower and a recovery mode where said reversible blower reverses to drive gas through said reversible blower from said adsorption bed;
said adsorption bed downstream from said reversible blower in said forward production mode, said adsorption bed containing adsorption media therein which preferentially adsorbs nitrogen over oxygen;
an oxygen and argon output downstream from said adsorption bed;
a high purity separation inlet downstream from said oxygen and argon output;
an argon separator downstream from said high purity separator inlet;
a high purity oxygen outlet downstream from said high purity separator inlet and spaced from said argon separator;
wherein said argon separator includes a gas cooler which cools the oxygen and argon gas sufficiently to at least partially liquefy oxygen therein; and
wherein said gas cooler includes a gas compressor with an inter-cooler downstream of said compressor and an expander downstream of said intercooler.

2. The separator of claim 1 wherein said expander includes a turbine, said turbine driving said compressor at least partially.

3. The separator of claim 2 wherein said expander includes a flow pathway with a constriction therein and with a lower pressure downstream of said constriction than upstream of said constriction.

4. The separator of claim 1 wherein a condenser is provided downstream of said expander, said condenser at least partially condensing oxygen therein into liquid oxygen.

5. The separator of claim 4 wherein a liquid oxygen storage is located downstream of a liquid outlet of said condenser, and with an oxygen delivery downstream of said liquid oxygen storage.

6. The separator of claim 4 wherein said condenser includes a gas outlet, said gas outlet leading away from said condenser and including an argon outlet downstream of said gas outlet of said condenser.

7. The separator of claim 6 wherein said gas outlet of said condenser also leads back to said compressor for recirculation of gas and further cooling thereof for additional liquid oxygen extraction.

8. A method for separating oxygen from air, including the steps of:
routing air into an oxygen separator having a reversible blower upstream of an adsorption bed, the reversible blower having a forward production mode where the reversible blower drives air through the reversible blower to the adsorption bed, and a recovery mode where the reversible blower reverses to drive gas from the adsorption bed through the reversible blower, the adsorption bed containing adsorption media therein which preferentially adsorbs nitrogen over oxygen and an oxygen and argon output downstream of the adsorption bed;
routing oxygen and argon from the oxygen and argon output to a high purity separator inlet;
separating argon from the gas mixture of oxygen and argon;
routing high purity oxygen to an oxygen outlet;
cooling the mixed gas of oxygen and argon until at least a portion of the oxygen condenses into a liquid;
compressing the mixed gas of oxygen and argon;
cooling the compressed mixture of oxygen and argon; and
expanding the mixed gas of oxygen and argon to a lower temperature than it had at the compressor until at least a portion of oxygen within the mixed gas of oxygen and argon condenses into a liquid.

* * * * *